United States Patent [19]
Griffith

[11] Patent Number: 5,954,802
[45] Date of Patent: Sep. 21, 1999

[54] SYSTEM FOR INTERFACING ISA COMPATIBLE COMPUTER DEVICES WITH NON-ISA BUSES USING SECONDARY DMA CONTROLLERS AND GLUE LOGIC CIRCUIT

[75] Inventor: Jenni Griffith, Belton, Tex.

[73] Assignee: Texas Instruments Incorporated, Dallas, Tex.

[21] Appl. No.: 08/792,608

[22] Filed: Jan. 31, 1997

Related U.S. Application Data

[60] Provisional application No. 60/010,917, Jan. 31, 1996.

[51] Int. Cl.[6] .................................................. G06F 13/28
[52] U.S. Cl. ............................ 710/22; 710/26; 710/27; 710/28
[58] Field of Search ........................... 395/500, 842, 395/846, 847, 848; 364/578

[56] References Cited

U.S. PATENT DOCUMENTS

| | | | |
|---|---|---|---|
| 4,429,373 | 1/1984 | Fletcher et al. | 364/900 |
| 4,811,007 | 3/1989 | Schreiber | 340/747 |
| 5,590,377 | 12/1996 | Smith | 395/842 |
| 5,619,726 | 4/1997 | Seconi et al. | 395/842 |
| 5,621,902 | 4/1997 | Cases | 395/309 |
| 5,655,142 | 8/1997 | Gephardt et al. | 395/800.32 |
| 5,673,400 | 9/1997 | Kenny | 395/309 |
| 5,724,529 | 3/1998 | Smith et al. | 710/129 |
| 5,729,762 | 3/1998 | Kardach et al. | 395/842 |
| 5,748,944 | 5/1998 | Ng | 395/500 |
| 5,765,024 | 6/1998 | Riley | 710/22 |
| 5,774,680 | 6/1998 | Wanner et al. | 710/110 |
| 5,878,272 | 3/1999 | Yanagisawa et al. | 710/3 |

Primary Examiner—Thomas C. Lee
Assistant Examiner—Chien Yuan
Attorney, Agent, or Firm—Ronald O. Neerings; Robby T. Holland; Richard L. Donaldson

[57] ABSTRACT

A system and method that allows ISA-compatible DMA devices (60) to communicate over non-ISA buses such as the VL bus (20) and a PCI bus (30). In a computer system (10) with a non-ISA bus, the present invention couples a secondary set of DMA controllers (50) in the same input/output space and a glue logic circuit (70) to the non-ISA bus in the computer system (10) to allow the ISA-compatible DMA device (60) to operate over the non-ISA bus. The secondary set of DMA controllers (50) provides the support for an ISA-compatible DMA device (60) to perform DMA transactions and the glue logic circuit (70) directs the DMA controller accesses to the proper place in the computer system (10).

22 Claims, 3 Drawing Sheets

SYSTEM FOR INTERFACING ISA COMPATIBLE COMPUTER DEVICES WITH NON-ISA BUSES USING SECONDARY DMA CONTROLLERS AND GLUE LOGIC CIRCUIT

This application claims priority under 35 USC § 119 (e) (1) of provisional application Ser. No. 60/010,917, filed Jan. 31, 1996.

TECHNICAL FIELD OF THE INTENTION

The present invention relates to systems and methods for supporting computer devices and, more particularly, to a system and method for allowing ISA compatible direct memory access (DMA) devices to operate over non-ISA buses.

BACKGROUND OF THE INVENTION

Computer systems typically include a central processing unit (CPU), devices within the computer such as memory storage devices, and the capability to interface with peripheral devices outside the computer by means of, for example, option slots. Computer systems use buses to carry the signals between these various components of the computer system allowing the CPU and the devices to communicate with each other. Until recently, computer systems typically used an Industry Standard Architecture (ISA) bus to provide the mechanism to transfer instructions between the CPU and peripherals. An ISA bus operates relatively slowly, on the order of 8 MHZ nominally. The computer devices operating over the ISA bus included both internal and peripheral direct memory access (DMA) devices to access memory storage devices within the computer. A standard exists for ISA-compatible DMA controllers that defines how to communicate with these DMA controllers, the DMA controller's address locations on the input/uotput (I/O) map, and how the DMA controllers work in general. The ISA-compatible DMA controllers standard is based on an 8237 Intel DMA controller.

Advancements in the computer industry have resulted in faster buses that operate on the order of 20–66 MHZ. Two of these newer, faster buses, the VESA Local (VL) bus and the Peripheral Component Interconnect(PCI) bus, have developed into standard buses in the computer industry. These buses allow faster operation, but do not provide DMA hardware or software support like the older ISA bus. This lack of hardware and software support on these faster buses does not typically present a problem for newer DMA devices because the newer DMA devices have been built and programmed to be compatible with the newer PCI and VL buses. Essentially, the PCI and VL bus compatible DMA devices have built into them the hardware and software that performs the function for the new DMA device that the ISA-compatible DMA controllers performed for the ISA-compatible DMA devices. These new DMA devices built to operate over the newer, faster PCI and VL buses must include sophisticated electronics and software support.

The older ISA-compatible DMA devices do not have this hardware support built into them because the older ISA-compatible DMA devices expect to have a DMA controller to perform the interface with ISA and memory buses. An ISA-compatible DMA device makes a request for access expecting an ISA-compatible DMA controller to set up ISA and memory buses and drive the devices. Because the newer PCI or VL buses do not have this type of DMA support, the older ISA-compatible DMA devices can no longer be used on a PCI or Vl bus. Computers with option slots, or other interface devices, connected to PCI and VL buses would benefit from being able to support ISA-compatible DMA devices over a PCI or VL bus.

SUMMARY OF THE INVENTION

In accordance with the present invention an apparatus and method is provided for interfacing ISA-compatible computer devices with non-ISA buses.

More specifically, the present invention provides a system and method that allows ISA-compatible DMA devices to operate over non-ISA buses such as the VL and PCI buses. To allow an ISA-compatible peripheral DMA device to perform DMA transactions over a non-ISA bus, the present invention couples a secondary set of DMA controllers and a glue logic circuit to the non-ISA bus in the computer system. This secondary set of DMA controllers occupies the same input/output (I/O) space as the internal DMA controllers. The secondary set of DMA controllers provides the support for an ISA-compatible DMA device to perform DMA transactions and the glue logic circuit directs the DMA controller accesses to the proper place in the system.

A translator device can also be included to translate the ISA-compatible commands, requests, and acknowledges into the proper format for the non-ISA bus.

In one embodiment, the glue logic circuit directs the DMA controller accesses to the proper place in the system by sending write requests to all DMA controllers in said computer system and by sending read requests to the DMA controller to last perform a DMA transaction.

One technical advantage provided by the present invention is it allows ISA-compatible DMA controllers and DMA devices Lo operate over either PCI or VL buses.

The present invention provides another technical advantage in that it requires no additional software support to allow the interface between the non-ISA bus and the ISA-compatible DMA controllers and devices. The present invention is transparent to drivers, the Basic Input Output System (BIOS) and application programs.

Yet another technical advantage of the present invention is the minimal hardware support required. Both the software and the hardware for VL bus and PCI bus compatible DMA devices must be much more sophisticated.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES like numerals being used to refer to like and corresponding parts of the various drawings.

Figure 1:
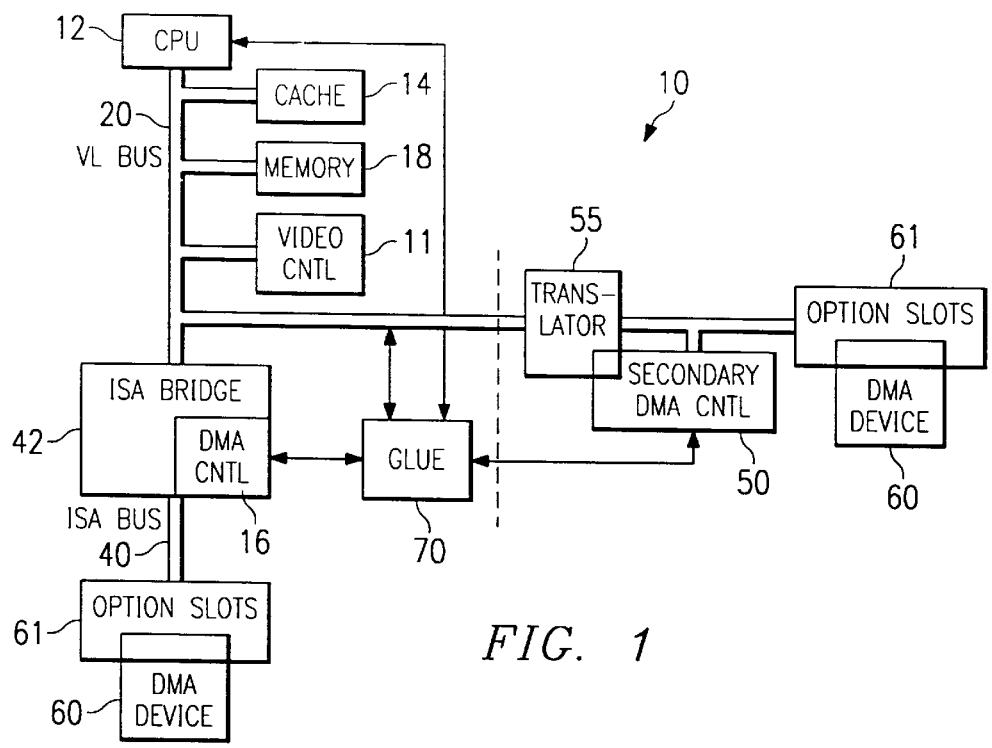
FIG. 1 shows a block diagram of a computer system, having a VL bus, that includes an embodiment of the present invention.

FIG. 1 illustrates a computer system 10 that includes CPU 12 coupled to a VL bus 20 at the first end of the VL bus 20. The CPU 12 creates the VL bus 20 by setting up the manner by which the bus will communicate. The CPU 12 can be connected to a variety of both internal and peripheral devices by the VL bus 20. In FIG. 1, the VL bus 20 connects the CPU 12 to internal devices including a memory device 18, a video controller 11, and a CACHE 14. The VL bus 20 can also connect the CPU 12 to option slots 61 capable of supporting peripheral devices such as ISA-compatible DMA device 60. Alternatively, a DMA device 60 can couple to the VL bus 20 directly without an option slot interface 61. A secondary set of ISA-compatible DMA controllers 50 is connected by the VL bus 20 between the ISA-compatible DMA device 60 and the CPU 12 to allow the ISA-compatible DMA device 60 to communicate over the VL bus 20. A translator device 55 can also be coupled to the VL bus 20 between the ISA-compatible DMA device 60 and the CPU 12. The translator device 55 and the secondary set of ISA-compatible DMA controllers 50 can be separate physical circuits, as shown in FIG. 1, or alternatively, can be combined into a single circuit. In an alternative embodiment, the translator device 55 can also include an ISA bridge chip to convert the VL bus 20 to an ISA bus over which the secondary set of ISA-compatible DMA controllers can then operate. This allows the secondary set of ISA-compatible DMA controllers 50 to operate as it would over an ISA bus. A "glue" logic circuit 70 is coupled to the computer system 10 and the VL bus 20. The VL bus 20 can terminate at an ISA bridge 42 at the second end of the VL bus 20. The ISA bridge serves to convert the VL bus to an ISA bus 40. The ISA bridge 42 shown includes the internal set of DMA controllers 16 that are used to control DMA transactions from DMA devices 60 in the internal portion of the computer system. The internal portion of the computer system comprises the portion of the computer system 10 that does not include peripheral and external components, for example, the secondary set of DMA controllers 50, the translator device 55, option slots 61 and peripheral ISA compatible DMA devices 60. The ISA bus 40 is coupled to the ISA bridge 42 at a first end and can terminate at a second end at option slots 61. These option slots 61, if present in the system, are operable to support internal ISA-compatible DMA devices 60. The ISA-compatible DMA devices 60 can couple directly to the ISA bus 40. The option slots and DMA devices hanging off the ISA bus 40 can be included as internal parts of the computer system 10.

Figure 2:
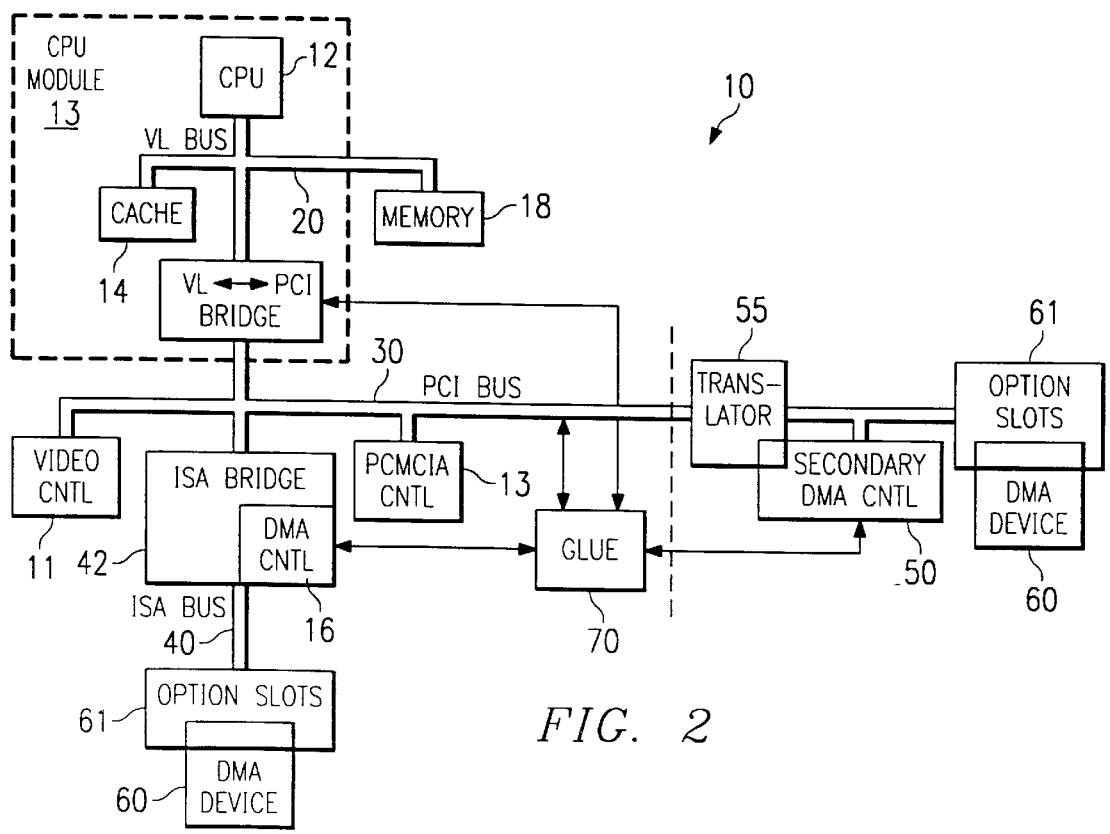
FIG. 2 shows a block diagram of a computer system, having a PCI bus, that includes an embodiment of the present invention.

FIG. 2 shows computer system 10 that includes CPU module 13 coupled to a PCI bus 30 created by the CPU module 13 at the first end of the PCI bus 30. The CPU module 13 includes a CPU 12, a VL bus 20, a CACHE 14, and a VL to PCI bridge 22. The PCI bus 30 connects the CPU 12 to internal devices including a video controller 11 and a PCMCIA controller 13. The PCI bus 30 further connects the CPU 12 to option slots 61 capable of supporting peripheral devices such as an ISA-compatible DMA device 60. A secondary set of ISA-compatible DMA controllers 50 is connected by the PCI bus 30 between the ISA-compatible DMA device 60 and the CPU module 13 to allow the ISA-compatible DMA device 60 to communicate over the PCI bus 30. A translator device 55 can also be coupled to the PCI bus 30 between the ISA-compatible DMA device 60 and the CPU 12. The translator device 55 and the secondary set of ISA-compatible DMA controllers 50 can be separate physical circuits, as shown in FIG. 2, or alternatively, can be combined into a single circuit. In an alternative embodiment, the translator device 55 can also include an ISA bridge to convert the PCI bus 30 to an ISA bus 40 over which the secondary set of ISA-compatible DMA controllers 50 can then operate. This allows the secondary set of ISA-compatible DMA controllers 50 to operate as it would over an ISA bus. A "glue" logic device 70 is coupled to PCI bus 30.

The PCI bus 30 can terminate at an ISA bridge 42 at the second end of the PCI bus 30. The ISA bridge 42, as described earlier, serves to convert the PCI bus to an ISA bus 40 that is coupled to the ISA bridge 42 at a first end and can terminate at a second end at option slots 61 that can support internal DMA devices 60.

Figure 3:
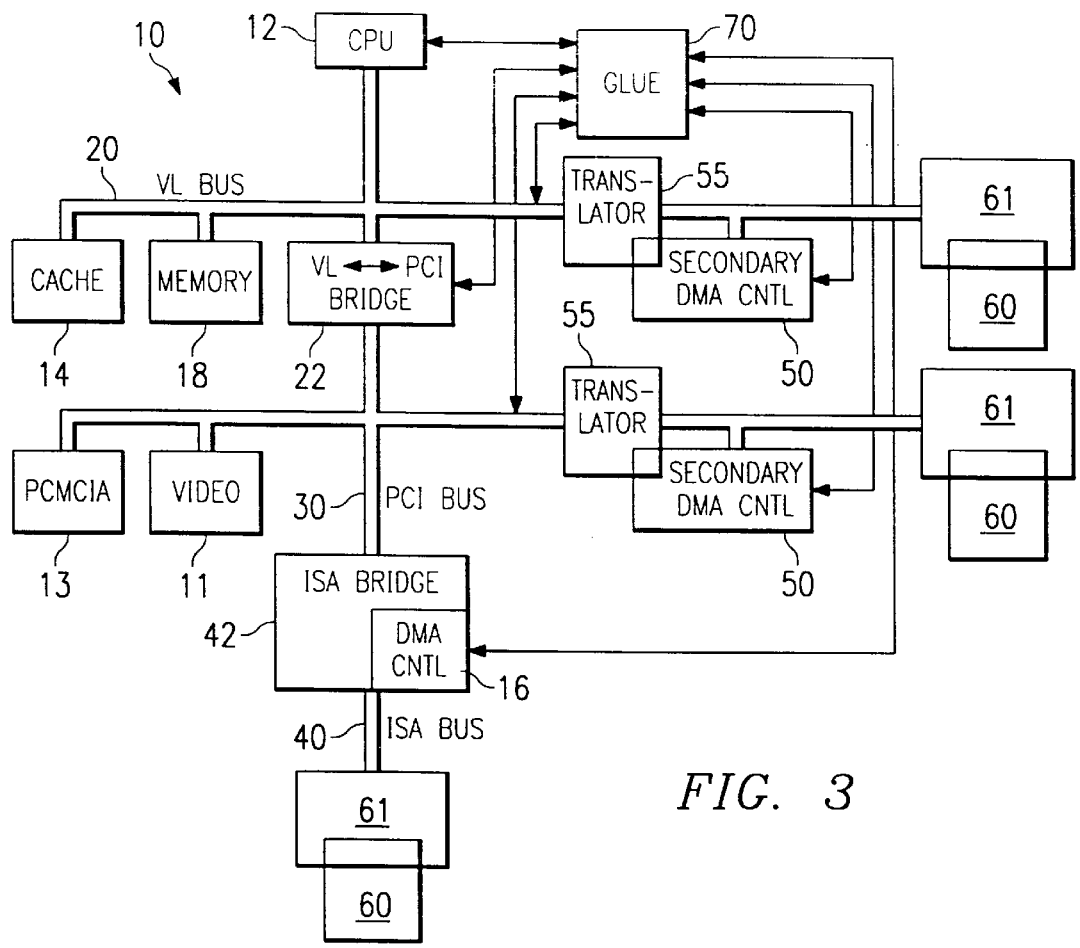
FIG. 3 shows a block diagram of a computer system, having both a VL bus and a PCI bus, that includes an embodiment of the present invention.

A computer system 10 can include both a VL bus and a PCI bus, both or either of which can support ISA compatible peripheral DMA devices. As shown in FIG. 3, the VL bus 20, coupled to the CPU 12 at a first end, can terminate at a PCI bus bridge 22 at the second end of the VL bus 20. The PCI bus bridge 22 serves to convert the CPU's VL bus 20 into a PCI bus 30. The PCI bus 30 can terminate at an ISA bridge 42 that converts the PCI bus 30 into an ISA bus 40. Each of these buses can terminate at option slots 61 to which internal or peripheral ISA compatible DMA devices 60 can be connected. A secondary set of DMA controllers 50 is coupled on both the PCI bus 30 and the VL bus 20 prior to the option slots 61. A translator 55 can also be coupled to both the PCI bus 30 and VL bus 20 prior to the option slots 61. This computer system 10 also includes a logic device 70 coupled to both the VL bus 20 and the PCI bus 30.

The computer systems 10 described in FIGS. 1, 2, and 3 are by way of example only. The devices within the computer could be attached to alternative buses, all devices need not be present, and additional computer devices could also be connected to the system. For example, the present invention will perform its function regardless of whether an ISA-compatible DMA device 60 is coupled to the VL bus, or to the PCI bus, or if DMA devices are coupled to both or neither of the VL and PCI buses. A computer system 10 including the present invention could comprise either a VL bus, a PCI bus, a proprietary bus, or some combination of thereof. Whenever a peripheral ISA-compatible DMA device is coupled to the computer system 10 by way of a non-ISA bus, the present invention utilizes a secondary DMA controller 50 and a logic circuit 70 to allow communication by the ISA compatible DMA device 60 over non-ISA bus.

A computer system 10 utilizing the present invention has at least one of either a VL bus 20, a PCI bus 30, or some other non-ISA bus connected to a peripheral ISA-compatible DMA device 60. Alternatively, the computer system could also have both a VI bus 20 a PCI bus 30 with at least one of these buses able to allow communication with a peripheral ISA-compatible DMA device 60. The computer system will usually include an ISA-type bus 40 with an ISA-compatible DMA controller 16 connected to the ISA bus 40. If the computer system 10 includes an ISA compatible DMA device 60 connected to either the slots 61 on the VL bus 20 or the PCI bus 30, then the communication problem arises The CPU 12 can create a VL bus 20 that terminates at a PCI bridge 22 that converts the bus into a PCI type bus that can terminate at an ISA-compatible bridge 42 that converts the bus into an ISA-type bus 40 inside the computer. Thus, inside the computer you can have an ISA bus 40 connected to option slots 61 that can include an ISA compatible DMA device 60 hanging off of the ISA bus 40. The internal or primary set of DMA controllers 16 controls the internal ISA-compatible DMA device 60.

During operation of the computer system, DMA transactions, such as reading from a floppy disk, transferring data over a network, or otherwise moving data, are performed. A read or a write request, typically from the CPU 12, can be made to a peripheral ISA-compatible DMA device 60 coupled to a non-ISA bus by way of option slots 61. ISA-compatible DMA devices 60 are not designed to communicate over the newer non-ISA buses. The peripheral ISA-compatible DMA devices 60 expect to be connected by way of an ISA bus to an ISA-compatible DMA controller that controls the DMA transaction. An ISA-compatible DMA device 60 expects request and acknowledge signals of a certain polarity over an ISA bus, however, these signals are opposite over some non-ISA buses (over an ISA bus the active was high, whereas over a non-ISA bus an active is low). Furthermore, non-ISA buses simply don't supply any DMA support—the hardware needed to support an ISA-compatible DMA device simply does not exist on these newer buses. DMA devices made to be compatible with VL buses 20 or PCI buses 30 have the controlling software and hardware built into them. These newer non-ISA compatible DMA devices supply the commands and addresses in order to have the data go to the proper location themselves. Older ISA-compatible DMA devices, without this additional support, expect to have a DMA controller that takes care of that function. Thus, the ISA compatible DMA peripherals simply cannot operate over a VL bus or a PCI bus without some additional support. The present invention provides that support in the form of a secondary set of DMA controllers 50 and glue logic circuitry 70 to allow an ISA compatible DMA device 60 to operate over these newer non-ISA buses. A translator 55 can be used to translate requests to the secondary DMA controllers 50 over the non-ISA bus into an ISA-compatible format. The present invention places this secondary set of DMA controllers 50 in front of the peripheral ISA-compatible DMA devices 60 on the non-ISA buses. These duplicate or secondary DMA controllers 50 have the same addresses and internal configuration as the internal DMA controllers 16. The secondary DMA controllers 50 occupy the same input/output space as the internal DMA controller 16. The glue logic circuitry 70 properly directs the requested accesses to the DMA controllers to one or all of the DMA controllers.

A DMA transaction involves setting up the DMA device, setting up the DMA controllers, and performing the DMA transfer. A peripheral non-ISA compatible DMA device 60 connected to a non-ISA bus will see a read or write request, typically from the CPU 12 which will then set up the device. For example, the CPU 12 will make a request for data from a peripheral floppy disk (an example of a DMA device) to be sent to memory within the computer.

The peripheral ISA-compatible DMA device 60 will then locate the requested data and send a request signal to the secondary set of DMA controllers 50. The duplicate or secondary set of DMA controllers 50 sees the request signal from the peripheral DMA device 60 and sends a request signal of its own to the translator device 55 that translates the ISA-compatible DMA controller's request into a format that can be transmitted over the non-ISA bus. The translated signal then goes to the arbiter controlling the non-ISA bus. For a VL bus, the arbiter is located, for example, in the glue circuitry 70. For a PCI bus, the arbiter can be located in the PCI bridge 22, the CPU 12, or the glue circuitry 70. The arbiter controlling the non-ISA bus sees the secondary DMA controller's translated active request signal and sets up the non-ISA bus to allow the secondary DMA controller 50 to perform the DMA transaction. The arbiter sets up the non-ISA bus by, for example, removing the CPU from the bus (if the CPU occupies the bus). The arbiter then sends an acknowledge signal back to the secondary DMA controller 50, that in turn, sends an acknowledge signal back to the ISA-compatible DMA device 60. The secondary DMA controller 50 then drives the buses and sends the data from the ISA-compatible DMA device 60 to the memory device 18, completing the DMA transaction. Without the secondary DMA controller 50, the ISA-compatible DMA device 60 would not have any support of the non-ISA bus and the DMA transaction could not be performed.

Glue Logic Directing Write Requests

The glue logic circuitry 70 of the present invention can allow the write from CPU 12 to be seen by all of the DMA controllers in the computer system 10, including the secondary DMA controllers 50. If a system includes an ISA, a VL, and a PCI bus, each with option slots 61 capable of supporting ISA-compatible DMA devices 60, during an I/O cycle which writes to a DMA controller, the glue logic circuitry 70 allows the writes to be seen by all three sets of DMA controllers on all three of the buses. The glue logic circuit 70 also ensures the writes to all of the DMA controllers have been completed before allowing the CPU 12 to begin the next operation.

Figure 4:
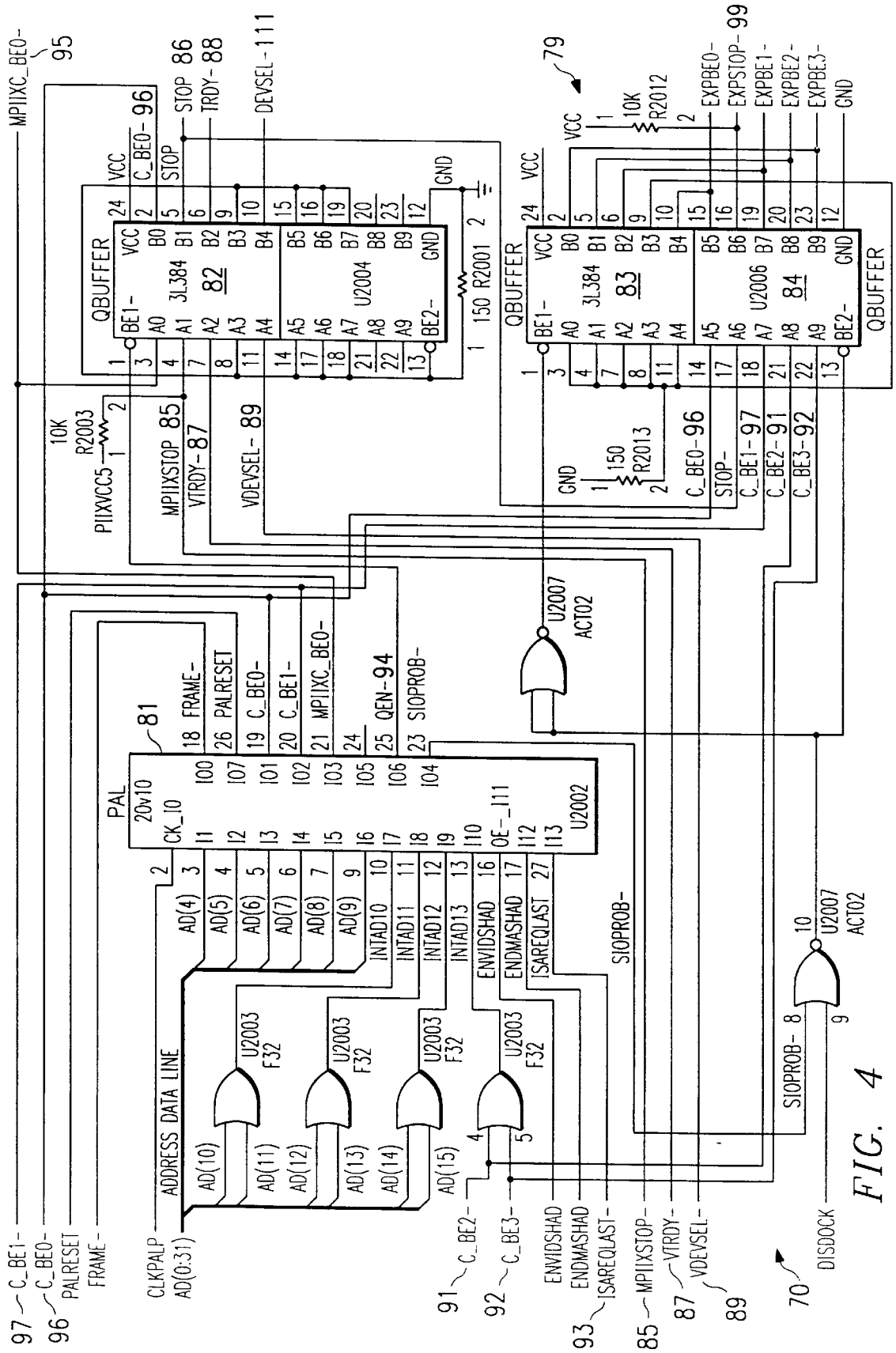
FIG. 4 shows a schematic diagram of one embodiment of a circuit used to force a controller on a PCI bus to abort a read transaction intended for the duplicate controller.

FIG. 4 describes one embodiment of the glue logic circuit that includes a PAL (programmable array logic) device and a Q buffer switch. Many different embodiments of the glue logic circuit could accomplish the goal of the present invention. Alternative embodiments of the glue logic circuit 70 could include other logic devices such as ASIC, PGA and discrete logic devices. In the embodiment of FIG. 4, PAL 81 is hooked up to the address/data lines at the PCI bus 30 at points labeled AD(4) through AD (15). PAL 81 also receives Command/byte enable signals C-BE2 91 and C-BE3 92, an ISAREQLAST signal 93 from PAL 80 that signals which DMA controller was the last to make the request or receive an acknowledge, and some I/O signals to enable the glue logic process. The PAL 81 sends out a QEN signal 94 to enable (close) the Q buffer 82. Q buffer 82 provides a switch between the internal DMA controller 16 and the PCI bus (that is either open or closed). Q buffer 82 also receives a MPIIXSTOP stop signal 85, a VTRDY target ready signal 87, a VDEVSEL device select signal 89, and a MPIIXCBE0 command byte enable zero signal 95 from the ISA bridge containing the internal target DMA controller.

A particular embodiment of the glue logic circuitry 70 sending the write signal to all the DMA controllers in the system is described by PAL 81 and Q buffer device 82 in FIG. 4. When the PAL 81 sees a request in an address range for one of the DMA controllers, the PAL 81 goes through a series of logic equations to determine what signals to output. If the request is a write request, the PAL 81 will send a QEN signal 94 to the Q buffer 82 that opens the Q buffer 82 so that the device select signal 89 and the T-ready signal 87 from the ISA bridge containing the internal DMA controller 16 will not get through to the non-ISA bus. The PAL 81 will allow the secondary ISA-compatible DMA controller's device select (DEVSEL) signal 111 and target ready (TRDY) signal to go to the initiator. The secondary DMA controller's device select signal 111 will issue when it has decoded its address range. The secondary DMA controller will then issue the TRDY signal 88 when it has finished. Thus, when the write signals are sent to multiple devices, the glue logic 70 allows the secondary DMA controller's device select signal to go through, and further ends the cycle when the DMA controller has issued its TRDY signal. In this embodiment, the internal DMA controller will complete the write cycle before the secondary DMA controller. This allows all DMA controller time to complete the transfer.

Glue Logic Directing Read Requests

For a read request, the CPU 12 sends out the read requests asking, for example, for the status of the DMA controllers 50. When the CPU 12 requests status from the DMA controllers, the request should go a particular DMA controller. In one embodiment of the present invention, the glue circuitry 70 can direct the request to the last DMA controller to perform a DMA transaction. In order to accomplish this, the glue logic circuitry 70 can track which DMA controller last performed a transaction, and when the CPU 12 sends out the read request, the glue logic circuitry 70 can send the read request to whichever set of DMA controllers has last received an acknowledge to do a DMA transaction. When the CPU 12 is attempting to read from the DMA controller, the glue logic circuitry 70 can block the read request from going to any more than one of the DMA controllers in the computer system. To illustrate, assume the ISA compatible DMA device 60 connected to the VL bus 20 in FIG. 3 was the last DMA device to make a request. The glue logic circuitry 70 would have tracked this event and knows that the peripheral DMA device 60 hanging off the VL bus 20 has made the last request. When the CPU 12 performs a read cycle to the DMA controller address range, the glue logic 70 blocks the request from going to either of the other two DMA controllers in the computer system (the one coupled to the PCI bus 30 and the one coupled to the ISA bus 40).

Figure 5:
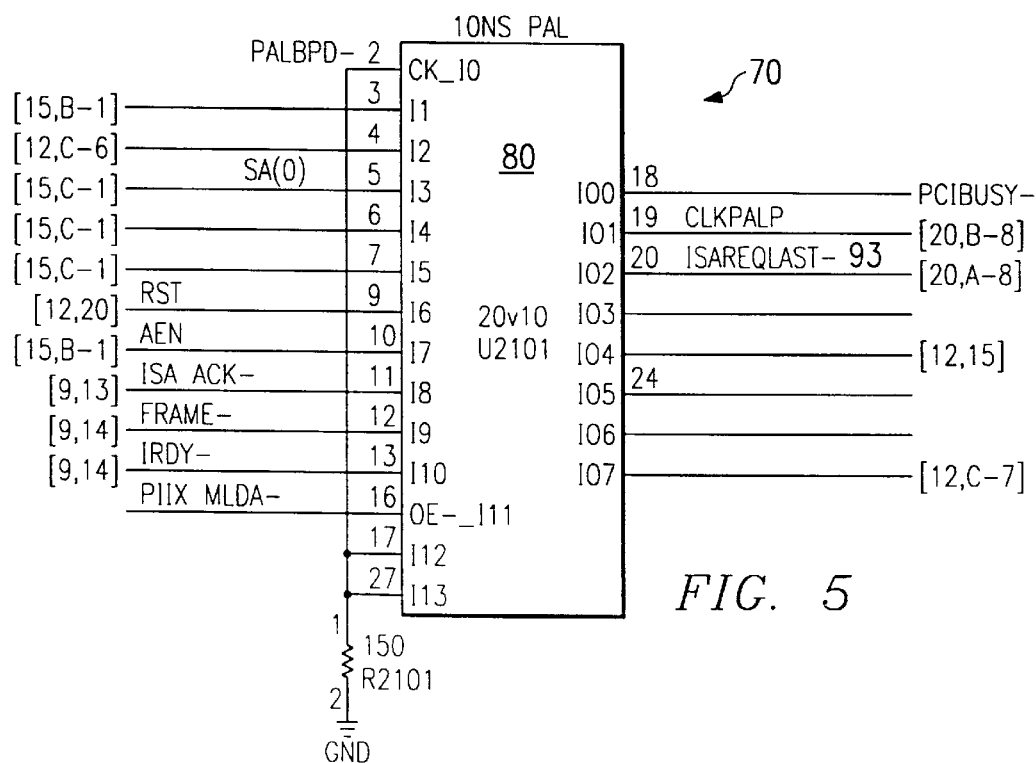
FIG 5. shows a schematic diagram of one embodiment of the circuit used to track DMA requests or acknowledges and direct DMA controller accesses.

FIG. 5 illustrates that for one embodiment of tracking the requests from the DMA controllers 50, the glue logic circuit 70 can include a Programmable Array Logic (PAL) 80. Alternative logic devices could also be used to perform the function of PAL 80. PAL 80 tracks which of the DMA controllers in the system last received a DMA transaction acknowledge by manipulating input signals through a series of logic equations. PAL 80 then sends this information to another portion of glue logic circuit 70 that uses the information from PAL 80 to send the request to one DMA controller 50.

There are many different approaches, well known in the art, that could be used to block the read from going over a VL bus 20 to a computer device, for example a secondary DMA controller 50, hanging off of a VL bus 20. For example address and cycle information could be decoded to decide whether to block the cycle start indication to a device.

Blocking a read cycle to a computer device on a PCI bus 30 is more difficult. A PCI bus has a well-defined set of signals including a "frame" signal that is used to signal a cycle or transfer over the PCI bus. The PCI cycle has two phases, an address phase and a data phase. The first clock is the address phase and after that, the data phase is entered. The second clock could enter the data phase, but the data phase does not necessarily have to be the second clock. The PCI bus 30 has signals that are used for commands in the address phase and as byte enables in the data phase. The PCI bus 30 also has signals that are used as addresses in the address phase and as data in the data phase. Depending on the PCI bus implementation, a PCI bus 30 will typically have 4 to 8 command/byte enable signals and 32 to 64 address/data signals. Because a device hanging off of a PCI bus 30 can perform actions requested on a particular address range, it is difficult to prevent the PCI device from performing the requested function.

The glue logic circuitry 70 decodes the access for the PCI device coupled to the PCI bus 30, and thereby prevents the device from performing the requested function. The PCI bus 30 specification includes a requirement that a device (or target) abort a cycle if the address (A), during the address phase, does not match the byte enables (BE) during the command phase. When the target device detects that A≠BE, the target device will send a "stop" signal out. Whenever a target device puts out a stop signal without first concluding the cycle, this is called a target abort. Thus, if A≠BE, a target device sends out a signal to abort and the cycle is aborted. However, in addition to forcing the target device to perform a target abort, the glue logic device 70 can also prevent the initiator from seeing that the cycle was aborted to prevent the initiator from ending the cycle. The glue logic circuitry 70 does this by blocking the stop signal to the PCI bus controller.

A particular method of blocking can be utilized to block the read access for any non-requested DMA controllers 50 (or 16) coupled to a PCI bus 30. In this method, the glue logic circuitry 70 forces the target DMA controllers 50 (or 16) to perform a target abort and allows the requested DMA controller 50 (or 16) in the computer system 10 to issue a target ready (TRDY) signal. One way to implement this particular blocking method over a PCI bus 30 involves including PALs and Q buffers within the glue logic circuitry 70. The Q buffer operates basically as a switch to either physically connect or disconnect a signal path. FIG. 4 illustrates one embodiment of the glue logic circuitry 70 for blocking reads over a PCT bus 30. As shown in FIG. 4, one glue logic circuit 70 can include PAL 81 that is further connected to Q buffer 82, Q buffer 83, and Q buffer 84. An active low enable signal will close the Q buffer to connect signals, while a high enable signal will open the Q buffer to disconnect signals. As shown in FIG. 4, when the enable signal for a Q buffer 82 is low, then MPIIX stop signal 85 and STOP signal 86 are physically connected; when the enable signal is high, these signals are disconnected.

FIG. 4 shows two different embodiments for blocking the read requests. The first is described by PAL 81 and Q buffer 82 for blocking the signal from getting to an ISA bridge containing an internal DMA controller 16. Alternatively, the ISA bridge need not contain the internal DMA controller 16; the internal DMA controller 16 could stand alone. The second is described by PAL 81 and Q buffers 83 and 84 for blocking signals from getting to the secondary DMA controllers 50. In the embodiment described by PAL 81 and Q buffer 82, the PAL 81 is hooked up to the address/data lines at the PCI bus 30 at points labeled AD(4) through AD (15). PAL 81 also receives Command/byte enable signals C-BE2 91 and C-BE3 92, an ISAREQLAST signal 93 from PAL 80 (shown in FIG. 5) that signals which DMA controller was the last to perform a DMA transaction, and some I/O signals to enable the glue logic process. The PAL 81 sends out a QEN signal 94 to enable the Q buffer 82. Q buffer 82 provides the switch for ISA bridge containing the internal DMA controller 16. Q buffer 82 also receives a MPIIXSTOP stop signal 85, a VTRDY target ready signal 87, a VDEVSEL device select signal 89, and a MPIIXBE0 command byte enable zero signal 95 from the internal ISA bridge containing the DMA controllers internal to the computer system 10.

When the PAL 81 sees a read access in an address range to a DMA controller 50 (or 16), the PAL 81 goes through a series of logic equations to determine what signals to output. If the request is a read request and the data is requested from a secondary DMA controller 50, the PAL 81 will again open the Q buffer 82, and can force the target DMA, in this case internal DMA controller 16, to perform a target abort in order to prevent the internal DMA controller 16 from attempting to supply read data. To accomplish this, the PAL 81 can manipulate the byte enable signal MPIIXBE0 95 and send the manipulated byte enable signal to the ISA bridge containing the internal DMA controller 16. The manipulation involves sending an unmatched byte enable signal. The internal target DMA controller 16 sees this manipulated byte enable signal that does not match the address signal and the ISA bridge containing the DMA controller 16 performs a target abort to abort the cycle. To prevent the initiator from seeing the abort cycle, the internal DMA controller's (16) stop signal 85 is isolated from the initiator. The internal DMA controller's stop signal 85 remains isolated by the Q buffer 82 from the internal buses stop signal 86. The result is that the internal DMA controller's stop signal 85 does not get through and the initiator does not re-initiate the sequence for the internal DMA controller 16. As the last device to make a request, the secondary DMA controller, or the requested device, performs the transaction. The blocking embodiment described by PALs 81 and 82 complies with the PCI bus specification.

FIG. 4 also describes an embodiment for blocking a read request involving data to be read from an internal DMA controller 16. Signals go to Q-buffer 79, that comprises Q-buffer 83 (upper portion) and Q buffer 84 (lower portion). Q buffer 83 is connected to the secondary DMA controller 50. Q buffer 79 receives command byte enable signals 96, 97, 91, and 92 in addition to stop signal 98 from the initiator for the bus. When a read request comes to the internal DMA controller 16, Q buffer 84 opens and Q buffer 83 closes, forcing an unmatched byte enable signal value out to the secondary DMA controller 50. The secondary DMA controller 50 can then perform a target abort. The initiator does not see the abort cycle because the secondary DMA controller's target stop signal 99 remains isolated by the Q buffer 84 from the initiator so that the secondary DMA controller's stop signal 99 does not get through to the bus stop signal 98. Because the secondary DMA controller's stop signal 99 does not get through, the initiator does not re-initiate the sequence for the secondary DMA controller 50. As the last device to make a request, the internal DMA controller 16 performs the transaction.

In summary, the present invention provides a system and method that allows ISA-compatible DMA devices to communicate over non-ISA buses such as the VL and PCI buses. In a computer system with an ISA-compatible peripheral DMA device connected to a non-ISA bus, the present invention couples a secondary set of DMA controllers and a glue logic circuit to the non-ISA bus in the computer system to allow the ISA-compatible DMA device to operate over the non-ISA bus. The secondary set of DMA controllers provides the support for an ISA-compatible DMA device to perform DMA transactions and the glue logic circuit detects the DMA controller accesses to the proper place in the system. The system and method of the present invention provide the advantage of allowing peripheral ISA-compatible DMA devices to communicate over faster non-ISA buses such as VL and PCI buses.

Although the present invention has been described detail, it should be understood that various changes. substitutions and alterations can be made hereto without departing from the spirit and scope of the invention as described by the appended claims.

What is claimed is:

1. A system for supporting the interface of an ISA-compatible direct memory access (DMA) device with non-ISA buses comprising:

a non-ISA bus for allowing communications more rapidly than the capability of an ISA bus;

a central process unit;

an internal computer memory device;

an ISA bus;

an internal DMA controller coupled to said ISA bus;

a secondary DMA controller, said secondary DMA controller operable responsive to said central processing unit to connect to said ISA-compatible DMA device over said non-ISA bus and to control DMA transactions from said ISA-compatible DMA device over said non-ISA bus, said secondary DMA controller further occupying the same input/output space as said internal DMA controller; and a glue logic circuit coupled to said non-ISA bus and to said controllers operable to direct requested access to the DMA controllers to selected DMA controllers.

2. The system of claim 1 wherein said requested access to selected DMA controllers further comprises write requests, and wherein said logic circuit properly directs said requested access to selected DMA controllers by sending said write requests to all DMA controllers in said computer system.

3. The system of claim 1 wherein said requested access to selected DMA controllers further comprises write requests, and wherein said logic circuit properly directs said requested access to selected DMA controllers by sending said write requests to all DMA controllers in said computer system and further wherein the glue logic circuit allows the cycle to end after all DMA controllers in the system have had sufficient time to complete the cycle.

4. The system of claim 1 wherein said requested access to selected DMA controllers further comprise write requests, and wherein said glue logic circuit properly directs said requested access to selected DMA controllers by sending said write requests to all DMA controllers in said computer system, said glue logic circuit further comprising:

a logic device operable to receive input signals, manipulate the input signals, and send output signals; and a switch device operable to receive input signals;

said logic device, when a request for access to a DMA controller is made, sending an output signal to open the switch for the non-requested DMA controller and preventing the non-requested DMA controller's device select and target ready signals from going to the system initiator and sending an output signal to close the switch for the requested DMA controller and allow the requested DMA controller's target ready and device select signals to go to the system initiator.

5. The system of claim 1 wherein said requested access to selected DMA controllers further comprise write requests, and wherein said glue logic circuit properly directs said requested access to selected DMA controllers by sending said write requests to all DMA controllers in said computer system, said glue logic circuit further comprises:

a programmable array logic device operable to receive input signals, manipulate the input signals, and send output signals, and a switch device operable to receive input signals;

said logic device, when a request for access to a DMA controller is made, sending an output signal to open the switch for the non-requested DMA controller and preventing the non-requested DMA controller's device select and target ready signals from going to the system initiator and sending an output signal to close the switch for the requested DMA controller and allow the requested DMA controller's target ready and device select signals to go to the system initiator.

6. The system of claim 1 wherein said requested access to selected DMA controllers further comprise read requests, and wherein said logic circuit properly directs said requested access to selected DMA controllers by sending read requests to a particular DMA controller.

7. The system of claim 1 wherein said requested access to selected DMA controllers further comprise read requests, and wherein said logic circuit properly directs said requested access to selected DMA controllers by sending read requests to the DMA controller to last perform a DMA transaction.

8. The system of claim 1 wherein said requested access to selected DMA controllers further comprise read requests, and wherein said glue logic circuit properly directs said requested access to the selected DMA controller by preventing all DMA controllers not responsible for the read request access from responding and thereby allowing the DMA controller responsible for the read request to perform said read request.

9. The system of claim 1 further comprising a peripheral ISA-compatible DMA device for making requests and accepting acknowledges, said peripheral ISA-compatible DMA device coupled to said non-ISA bus and thereby connected to said memory device.

10. The system of claim 1 further comprising a translation device coupled to said secondary DMA controller, further coupled to said non-ISA bus, operable to translate requests from the secondary DMA controller into a format for requests over said non-ISA bus, and further operable to translate requests to the secondary DMA controller over the non-ISA bus into a format acceptable to the secondary DMA controller.

11. The system of claim 1 further comprising a translation device coupled to said secondary DMA controller, further coupled to said non-ISA bus, operable to translate requests from the secondary DMA controller into a format for requests over said non-ISA bus, and further operable to translate requests to the secondary DMA controller over the non-ISA bus into a format acceptable to the secondary DMA controller, and wherein said translator further comprises said secondary DMA controller.

12. The system of claim 1 further comprising an arbiter device in communication with the secondary DMA controllers, said arbiter device operable to control access to the non-ISA bus upon receiving request signals from the DMA controllers, thereby to allow the DMA controllers access to the non-ISA bus in order to perform the DMA transaction from the ISA-compatible DMA device.

13. The system of claim 1 wherein said non-ISA bus comprises a PCI bus.

14. The system of claim 1 wherein said non-ISA bus comprises a VL bus.

15. The system of claim 1 wherein said computer system further comprises a second non-ISA bus further wherein said first non-ISA bus is coupled to said central processing unit at a first location and coupled to a bridge at a second location, said bridge operable to convert the first non-ISA bus to said second non-ISA bus.

16. A method for supporting a direct memory access (DMA) transaction over a non-ISA bus between a peripheral ISA-compatible DMA device, in a computer system with a CPU, a non-ISA bus, a memory device, and an internal DMA controller, comprising:

providing a secondary DMA controller;

coupling said secondary DMA controller to said non-ISA bus;

coupling a glue logic circuit responsive to said CPU to said non-ISA bus;

configuring the secondary DMA controller such that the secondary DMA controller occupies the same input/output space as the internal DMA controller;

controlling DMA transactions from said peripheral ISA-compatible DMA device with said secondary DMA controller;

driving the non-ISA bus to perform the requested DMA transaction with said secondary DMA controller; and directing requested access to selected DMA controllers with said glue logic circuit.

17. The method of claim 16 wherein said directing requested access to selected DMA controllers further comprises sending write requests to all DMA controllers in said computer system.

18. The method of claim 16 wherein said directing requested access, to selected DMA controllers further comprises:

sending write requests to all DMA controllers in said computer system; and preventing the write cycle from completing until after all the DMA controllers have finished the write operation.

19. The method of claim 16 further comprising directing the cycle to end when all DMA controllers in the system issue a ready signal when all DMA controllers in the system have completed the write operation.

20. The method of claim 16 wherein said directing requested access to selected DMA controllers further comprises sending read requests to a particular DMA controller.

21. The method of claim 16 wherein said directing requested access to selected DMA controllers further comprises sending read requests to the DMA controller to last perform a DMA transaction.

22. The method of claim 16 wherein said directing requested access to selected DMA controllers further comprises preventing all DMA controllers not responsible for the read request access from issuing signals preventing the DMA controllers not responsible for the read request access from performing the DMA controller access and thereby allowing the DMA controller responsible for the read request to perform said read request.

* * * * *